Dec. 18, 1951  L. SUKACEV  2,579,405
SELF-HEATING CONTAINERS
Filed Nov. 3, 1950
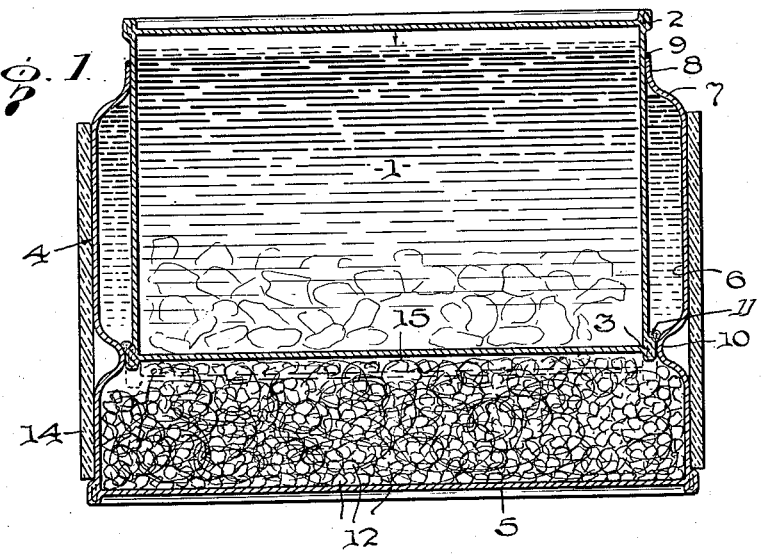
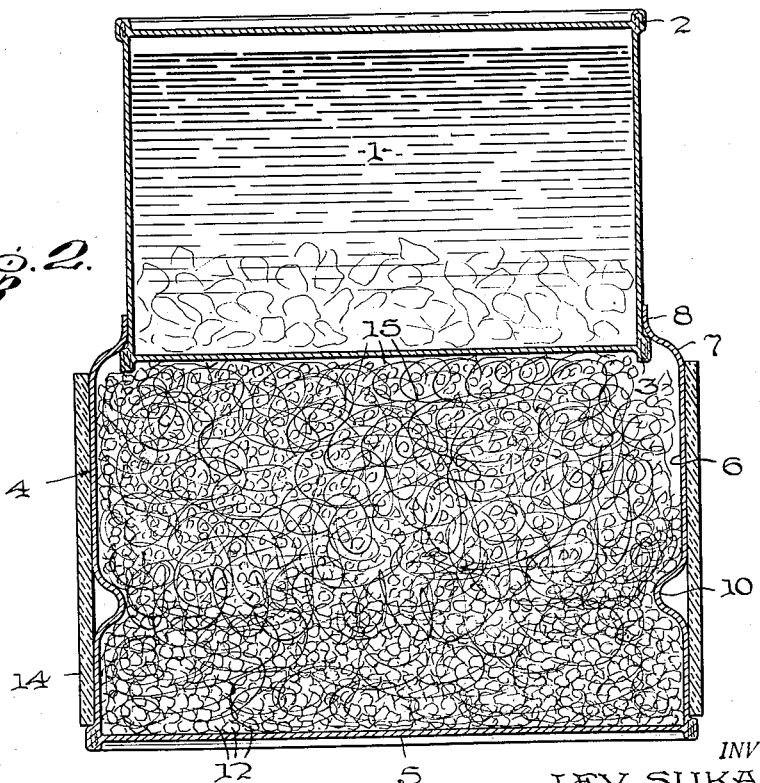
INVENTOR.
LEV SUKACEV
ATTORNEYS

UNITED STATES PATENT OFFICE 2,579,405

SELF-HEATING CONTAINERS

Lev Sukacev, Washington, D. C.

Application November 3, 1950, Serial No. 193,869

10 Claims. (Cl. 126—263)

This invention relates to containers for the packaging of foods and other materials and which includes an exothermic material which, when activated with water, will supply sufficient heat to raise the temperature of the food or other material to the desired temperature for eating. Such containers are particularly adapted for use under conditions where it is impossible or impractical to prepare hot foods by the usual means for heating food.

The container of the present invention is of that type in which the food container is mounted in an outer container which carries an exothermic material which will react with water to liberate a large amount of heat, and sufficient water to activate the exothermic material. It is particularly designed for use with an exothermic material such as burnt lime, or mixtures containing the same, which, during its reaction with water to liberate the necessary heat to bring the food to the desired temperature, normally would expand and create a substantial and possible rupturing pressure on the enclosing container unless the container were made of material of extra strength to withstand such pressure, or unless some means were provided to permit such expansion. In order that the cost of the container shall not be increased by the use of stronger and more expensive stock than normally is used in metal containers for the packaging of foods, the present invention contemplates a self-heating container which is so designed that a limited telescopic movement of the food container within the outer container is provided to compensate for the expanding exothermic material.

The primary object of the present invention is to provide a simply constructed, self-heating container of the kind referred to above in which a separate vessel need not be provided for the water to activate the lime or other exothermic material, and in which an effective but readily-rupturable seal is maintained between the compartment for the exothermic material and the compartment in which the water is stored.

A further object of the invention is to provide a self-heating container as described which may be completely assembled as far as the exothermic material and the water for activating it are concerned and furnished in that state to a food packer for filling with food and sealing in the usual manner.

Other objects of the invention will appear from the accompanying drawing and the detailed description in connection therewith.

In the drawings:

Fig. 1 is a vertical sectional view through a preferred form of a self-heating container embodying the invention, and Fig. 2 is a view similar to Fig. 1, showing the position assumed by the food container during the heating of the food therein.

Referring to the drawings, the self-heating container of the invention comprises a container 1 for canned food, soup, or the like, all hereinafter referred to as "food." The container 1 may be the usual tinned or lacquered metal can which has the top and bottom crimp-sealed to the side wall, as at 2 and 3, respectively.

The food container is received within an outer container 4 having a bottom 5 and side walls 6, but no top. The bottom 5 is crimp-sealed to the side walls 6. The upper portion of the side walls of the outer container converges inwardly as at 7 and then again extends vertically to provide a flange 8 which lies in contact with the side wall of the food container and is sealed thereto at its upper end with a readily-rupturable sealing medium, such as a relatively weak solder 9 or the like.

The side walls 6 of the outer container opposite the lower crimped seal 3 are grooved inwardly as at 10 to an extent such that the inner wall of the bottom of the grooved portion contacts the crimped seal 3. The crimped seal 3 is soldered as at 11 with a relatively weak solder to the base of the groove 10 to form a water-tight joint.

The space between the bottom of the food container and the bottom 5 of the outer container 4 is filled with granular burnt lime 12 or other exothermic material which will react with water to liberate sufficient heat to bring the food in the container 1 to the desired temperature.

Water for activating the exothermic material is stored in the space between the side walls of the food container 1 and the outer container 2, and between the soldered joint 11 and the upper end of the side wall of the outer container which is sealed to the food container.

A sleeve 14 of any suitable insulating material, such as paper board, cardboard, or the like, fits around the outer container to prevent dissipation of heat when the exothermic material is activated, to place the self-heating container in operation.

In assembling the container of the present invention, the desired amount of lime or other exothermic material is first placed in the bottom of the outer container 4 before the upper end of its side wall 6 has been bent inwardly as indicated at 7. Normally the groove 10 will be formed in the side wall of the outer container at such a place that when the desired amount of lime has been introduced into the outer container the top thereof will be at the level of the groove 10. The unfilled food container then is inserted into the outer container until it rests on the lime 9 with its lower-crimped-seal 3 opposite the groove 10. Solder then is introduced between the side walls of the food container and the outer container and the soldered joint 11 formed. Water then is introduced into the space between the side walls of the two containers to the desired level, and the upper edge portion of the side wall of the outer container is then bent inwardly and the edge soldered to the side wall of the food container. The self-heating container is now ready for filling with food and is shipped to the food packer in that condition. The food packer fills the food container and crimp seals the top to the side walls thereof in the customary manner.

When it is desired to put the self-heating container into operation, it is only necessary to strike the top of the food container with one's open hand. Such a blow will rupture the seals 9 and 11 and force the food container inwardly to the position shown in broken lines in Fig. 1, permitting the water to flow between the food container and the groove 10 into the lime compartment where it reacts with the lime with resultant liberation of heat sufficient to warm the food in the food container to the desired extent.

The reaction of the lime with the water causes the lime to expand. The expanding lime lifts the food container until the lower crimped-seal 3 engages the inwardly-extending portion 7 of the upper part of the side wall of the outer container, which acts as a stop to limit further telescopic movement of the food container.

The force of the expanding lime against the bottom of the food container will cause a pressure contact of the crimped seal 3 with the inturned portion 7 which prevents any of the lime being forced out between the food container and the vertically-extending flange 8.

The top of the food container may be opened either before or after the food has become heated. If opened before the food has become heated, the container, being cooler, can be better handled; also, by opening the food container first, access to the food for stirring during the heating operation can be obtained.

Instead of providing the side wall of the outer container 2 with an inwardly-extending groove to be soldered to the lower crimped seal of the food container, the side wall of the outer container may be made straight opposite the crimped seal 3, and the lower edge of the food container be bulged outwardly or otherwise provided with an outwardly-extending portion which may be soldered to the straight side wall of the outer container.

As lime is a poor conductor of heat, a springy mass of shavings 15 of a metal of high heat conductivity, such as aluminum, copper, etc., in amount of between about 5% to 20% of the weight of the lime, is embedded in the lime. Such shavings act as heat conductive paths to facilitate the conduction of heat from the interior of the body of the expanded lime to the bottom of the food container.

The invention is not limited by the above detailed description beyond the scope of the subjoined claims, and it is to be understood that various changes may be made in the details of construction without departing from the scope of the invention or sacrificing any of the advantages thereof.

I claim:

1. A self-heating container comprising an outer container having a bottom and side wall, an inner container telescopically mounted within the outer container, exothermic material between the bottom wall of the outer container and the bottom wall of the food container, a rupturable water-tight seal between the food container and the side wall of the outer container, and water sealed within the space between the side walls of the food container and the outer container, above said water-tight seal, said seal offering less resistance to rupture than the parts connected thereby offer to distortion when subject to pressure exerted on the outer end of the food container, whereby the seal readily may be ruptured to permit said water to pass to the exothermic material by a blow on the outer end of the food container.

2. A self-heating container as defined in claim 1 in which the rupturable seal between the food container and the wall of the outer container is adjacent the lower peripheral edge of the food container.

3. A self-heating container as defined in claim 1 in which the side wall of the outer container has an inwardly-extending peripheral groove, and said water-tight seal is between the base of said groove and the food container.

4. A self-heating container as defined in claim 1 in which the side wall of the outer container has an inwardly-extending peripheral groove, and said water-tight seal is between the base of said groove and the lower peripheral edge of the food container.

5. A self-heating container as defined in claim 1 in which the upper edge portion of the side wall is bent inwardly and is sealed to the side wall of the food container with a rupturable water-tight seal similar to that between the food container and the side wall of the outer container.

6. A self-heating container as defined in claim 5 in which the food container has an outwardly-extending crimped seal, which on expansion of the exothermic material engages the inwardly-bent upper edge portion of the outer container to limit outward telescopic movement of the food container in the outer container.

7. A self-heating container as defined in claim 5 in which the inwardly-bent upper edge portion of the outer container is sealed to the side wall of the food container below the upper edge of the food container.

8. A self-heating container as defined in claim 5 in which the upper edge of the food container has an outwardly-extending crimped seal which overlies the upper edge of the side wall of the outer container, and in which the upper edge portion of the outer container is sealed to the side wall of the food container a distance below the crimped seal of the food container.

9. A self-heating container as defined in claim 1 which has metal shavings embedded in the exothermic material to form heat-conductive paths from the interior of the exothermic material to the bottom of the food container.

10. A self-heating container as defined in claim 1 in which the rupturable seal is formed by a weak soldered joint between the side wall of the outer container and the food container.

LEV SUKACEV.

REFERENCES CITED

The following references are of record in the file of this patent:

UNITED STATES PATENTS

| Number | Name | Date |
|---|---|---|
| 628,359 | Schindler | July 4, 1899 |
| 794,848 | Bohm | July 18, 1905 |
| 1,971,364 | Zimmer, et al. | Aug. 28, 1934 |
| 2,212,441 | Katz | Aug. 20, 1940 |

FOREIGN PATENTS

| Number | Country | Date |
|---|---|---|
| 407,332 | France | Dec. 27, 1909 |
| 70,425 | Australia | Nov. 10, 1915 |
| 747,004 | France | Mar. 21, 1933 |